No. 728,612. PATENTED MAY 19, 1903.
W. H. PRATT.
MEANS FOR COMPENSATING TEMPERATURE CHANGES IN ELECTRICAL MEASURING INSTRUMENTS.
APPLICATION FILED DEC. 12, 1902.
NO MODEL.
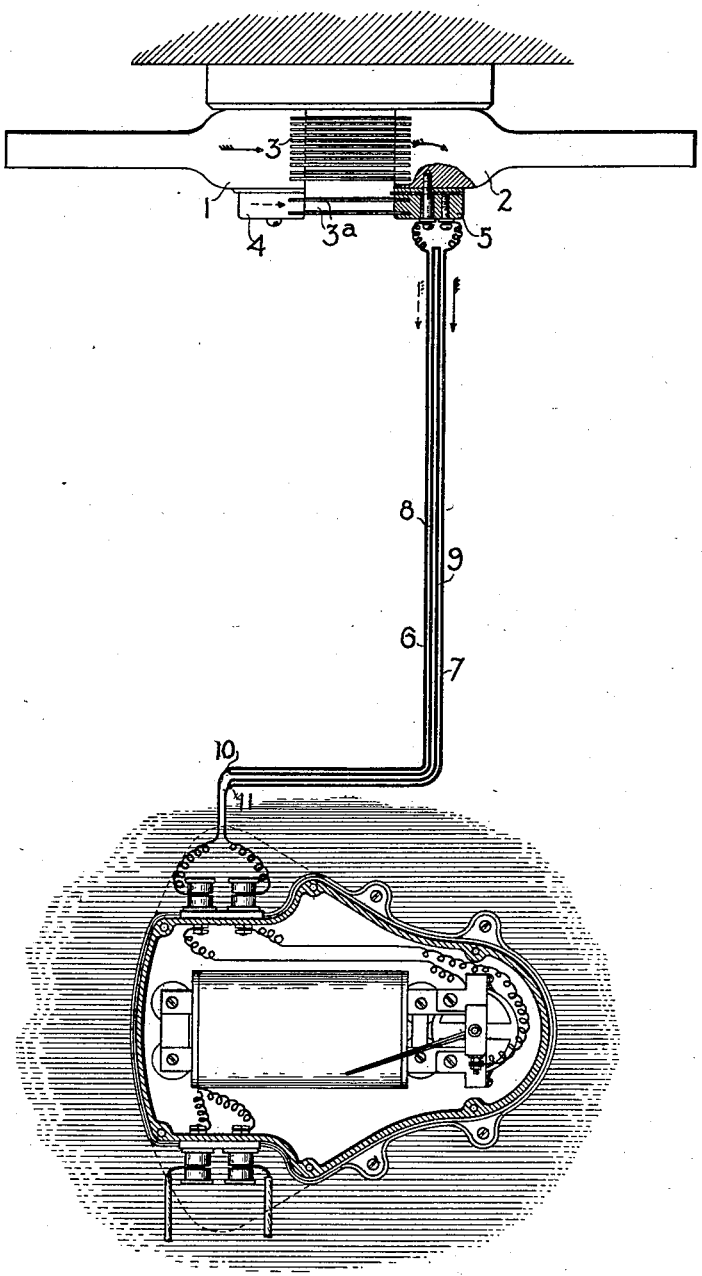
Witnesses:
Inventor.
William H. Pratt,
By
Att'y.

No. 728,612. Patented May 19, 1903.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

MEANS FOR COMPENSATING TEMPERATURE CHANGES IN ELECTRICAL MEASURING INSTRUMENTS.

SPECIFICATION forming part of Letters Patent No. 728,612, dated May 19, 1903.

Application filed December 12, 1902. Serial No. 134,908. (No model.)

*To all whom it may concern:*

Be it known that I, WILLIAM H. PRATT, a citizen of the United States, residing at Lynn, county of Essex, State of Massachusetts, have invented certain new and useful Improvements in Means for Compensating Temperature Changes in Electrical Measuring Instruments, of which the following is a specification.

A source of inaccuracy in ammeters and other types of electrical measuring instruments, especially where the leads between the instrument and the circuit are long, arises from changes of temperature, which vary the resistance, and thus cause changes in the potential drop across the instrument-terminals. Another source of error in the case of shunted instruments, as ammeters, arises from the uneven temperature of the joints at the shunting resistance. It is common to employ for such shunting resistance a group of thin conductors so arranged as to permit free circulation of air, and thus prevent any considerable heating, these being secured at their ends to massive copper terminals. These joints may be at different elevations or at such distances apart that different currents of air may reach them, and the inequality of joint temperature develops a thermo-electromotive force which assists or opposes the electromotive force of the bus-bars, and thereby introduces a source of error into the instrument. Similarly, in cases where the leads are taken some distance from the source the temperatures at different points will be unequal and will in any event not be constant, thereby varying the drop, and consequently affecting the potential at the terminals of the instrument.

It is the object of my invention to compensate these sources of error. I compensate for that component due to the thermal variation at the shunt-resistance joints by setting up counterelectromotive force equal in value to that established by the difference in temperature of the shunt-resistance joints. This may be simply and effectively established by placing in close juxtaposition to the said joints or to the massive terminals with which they are connected an auxiliary resistance-path the joints of which are arranged to yield on opposing thermo-electromotive force. For example, one terminal of this auxiliary or compensating shunt may be in both heat and electric conductive relation to one terminal, the other being in heat-conductive relation only to the other terminal, the terminals of the instrument being connected to the two terminals electrically insulated from each other. Thus any change of temperature which sets up an assisting electromotive force in the main portion of the shunt resistance will develop a counter electromotive force in the auxiliary resistance. I compensate for that component of error due to the length of the leads by shunting the instrument-terminals by a path having a higher temperature coefficient than the leads themselves, this path being coextensive in length and in location with the leads themselves. Thus any change of potential drop across the instrument-terminals due to a change in resistance of the leads, and which would tend to alter the strength of current flowing through the instrument, will be compensated by a corresponding change in conductivity of the wire shunt. If, for example, an increase of temperature occurs, the leads, increasing in resistance, will tend to cause a decrease of the drop across the coil-terminals of the instrument; but the increase in resistance in the wire shunt will tend to raise the potential at the coil-terminals, and thus obviate this drop, and thereby render the potential drop independent of temperature changes.

My invention therefore comprises a thermal compensator for electrical measuring instruments having means for establishing a counter electromotive force equal in value to and opposing the thermal electromotive forces set up by differences of temperature at different points of the shunt.

It comprises also a thermal compensator for temperature changes in the instrument-leads comprising a shunt similarly located to the leads having a greater temperature coefficient.

It comprises also other features more specific, the novelty of which will be hereinafter more fully pointed out.

In the accompanying drawing, which illustrates the invention, 1 and 2 represent shunt-terminals such as are commonly employed for ammeters. These are made of massive copper, across which extend a number of parallel resistance-conductors 3, which constitute the shunt. These are permanently fixed in the copper terminals. The ends which are in engagement with the opposite terminals being some distance apart are differently affected by local air-currents or closer approach to other metal bodies, thereby establishing a thermal electromotive force due to the difference in temperature of the two points. This will develop an electromotive force assisting or opposing the bus-bar or distributing-circuit electromotive force, according to which is the heated joint. This may be effectively compensated for by providing one or more auxiliary strips 3ª, the terminals 4 5 of which are in heat-conductive relation to the terminals 1 2, but one of which is electrically insulated, as the joint between 2 and 5, in order to avoid a short circuit. Thus if the instrument-leads are connected to the points 2 and 5, as indicated in the drawing, a change of temperature which would cause the electromotive force in the shunt resistance 3 to move in the direction indicated by the full-line dart would be compensated by the equal and opposing thermal electromotive force of the auxiliary resistance, which would develop an electromotive force in the direction indicated by the broken-line dart. The resistance-sections 3ª may be considered an extra length of lead and treated accordingly. This simple organization is practically very effective in obviating a source of error due to change of temperature at the shunt-joints. In order to compensate for the variations of temperature or lack of uniformity in the same as to the leads, I provide in addition to the instrument-leads, as shown at 6 and 7, a loop or shunt trained through the same neighborhood, so as to be subjected to the same temperature conditions. Such a loop is shown at 8 9, being composed of two wires which may be formed in the same cable or envelop with the leads, connected at their outer ends so as to form a loop, the terminals being connected with the leads at a point at or closely adjacent to the instrument, as indicated at 10 11. The material of which this shunt is composed must have a temperature coefficient greater than that of the leads 6 7. Thus the current which passes through the leads 6 7 from the instrument shunt divides, one branch passing through the coil of the instrument and the other through the resistance-loop 8 9. Suppose the temperature to increase, the current diverted from the instrument by the loop 8 9 will diminish by reason of the increase in resistance of the loop, and consequently the drop over the leads 6 7 will diminish due to the diminishing current to the same extent that the drop tends to increase due to the increased resistance of the loop 8 9; or, to state the matter differently, the instrument-coil and the resistance-loop 8 9 are connected in parallel, and with a rise of temperature less current flows through the leads 6 7; but in this the proportion which passes through the instrument increases in consequence of the increase of resistance of the shunting path 8 9. If the leads 6 7 are of copper, the circuit 8 9, if of iron, should be of such resistance as to take twice the current of the instrument. For materials of greater diversity of temperature coefficient the ratio of currents should be smaller. This provision is particularly applicable where instruments are fed by leads extending a considerable distance from the shunts, and especially where it is necessary to carry such leads through the vicinity of steam-pipes or other heating devices, which render the resistance an uncertain quantity.

What I claim as new, and desire to secure by Letters Patent of the United States, is—

1. A temperature-compensator for instrument-shunts, comprising a thermo-electric couple having the joints exposed to the same temperature conditions as the shunt-joints and connected with the instrument-terminals so as to provide an opposing thermo-electromotive force.

2. A temperature-compensator for the shunts of electrical measuring instruments, comprising a thermal couple in series with the instrument-leads, having its joints in good heat-conductive relation to the shunt-joints.

3. A temperature-compensator for electrical measuring instruments, comprising two sets of resistance-bars in heat-conductive relation to each other, one set being in series and the other in parallel relation to the instrument.

4. A temperature-compensator for electrical measuring instruments, comprising an instrument-shunt, a thermal couple having its opposite joints in engagement with the massive shunt-terminals, and connections for directing the thermo-electromotive force due to the shunt-joints in an opposite direction through the instrument-coils to that of the auxiliary thermal couple.

5. Means for compensating the error due to temperature changes in electrical measuring instruments, comprising a resistance shunting the instrument-coil extending through the same neighborhood as the instrument-leads, said resistance having a higher temperature coefficient than the leads.

6. A temperature-compensator for electrical measuring instruments, comprising a cable containing two groups of conductors, one in parallel and the other in series relation to the instrument-coils, the one in parallel relation having the higher temperature coefficient.

7. A temperature-compensator for electrical measuring instruments, comprising a cable containing two groups of conductors, one in parallel and the other in series relation to the instrument-coils, the one in parallel having the higher temperature coefficient and of a resistance to equalize the change of drop across the instrument-coil due to change of temperature.

In witness whereof I have hereunto set my hand this 10th day of December, 1902.

WILLIAM H. PRATT.

Witnesses:
DUGALD McK. McKILLOP,
HENRY O. WESTENDARP.